US012130652B2

(12) United States Patent
Palmer

(10) Patent No.: US 12,130,652 B2
(45) **Date of Patent: *Oct. 29, 2024**

(54) FOLDABLE KEYBOARD SUSTAIN PEDAL STABILIZER

(71) Applicant: Fred Palmer, Detroit, MI (US)

(72) Inventor: Fred Palmer, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,678

(22) Filed: Feb. 7, 2023

(65) Prior Publication Data

US 2023/0236619 A1 Jul. 27, 2023

Related U.S. Application Data

(63) Continuation-in-part of application No. 17/978,303, filed on Nov. 1, 2022, and a continuation-in-part of application No. 16/998,490, filed on Aug. 20, 2020, now Pat. No. 11,493,947, and a continuation-in-part of application No. 16/270,428, filed on Feb. 7, 2019, now Pat. No. 10,755,680.

(51) Int. Cl.
*G10C 3/26* (2019.01)
*G05G 1/483* (2008.04)

(52) U.S. Cl.
CPC ............... *G05G 1/483* (2013.01); *G10C 3/26* (2013.01)

(58) Field of Classification Search
CPC ............. G05G 1/483; G10C 3/26; G10D 3/00
See application file for complete search history.

(56) References Cited

U.S. PATENT DOCUMENTS 5,075,906 A 12/1991 Robbins
8,022,283 B1 9/2011 Williams, Jr.

*Primary Examiner* — Kimberly R Lockett
(74) *Attorney, Agent, or Firm* — Gerald R. Black, Esq.

(57) ABSTRACT

The foldable keyboard sustain pedal stabilizer is designed for use with either one keyboard sustain foot pedal or two keyboard sustain foot pedals. The foldable keyboard sustain pedal stabilizer comprises a stabilizer base, a pedal-retention area in cooperative engagement with the stabilizer base, a foldable section sandwiched between the stabilizer base and the pedal-retention area, and an underside having a non-slip surface. The foldable section is made of a flexible material such that the pedal-retention area folds onto the stabilizer base for packaging and transporting in a compact manner. The foldable keyboard sustain pedal stabilizer provides stable footing for the musician on damp floors for one foot or both feet while providing a foldable keyboard sustain pedal stabilizer that stabilizes either one or two keyboard sustain foot pedals. The foldable keyboard sustain pedal stabilizer has no moving parts and is compatible with essentially any keyboard sustain foot pedal.

24 Claims, 8 Drawing Sheets

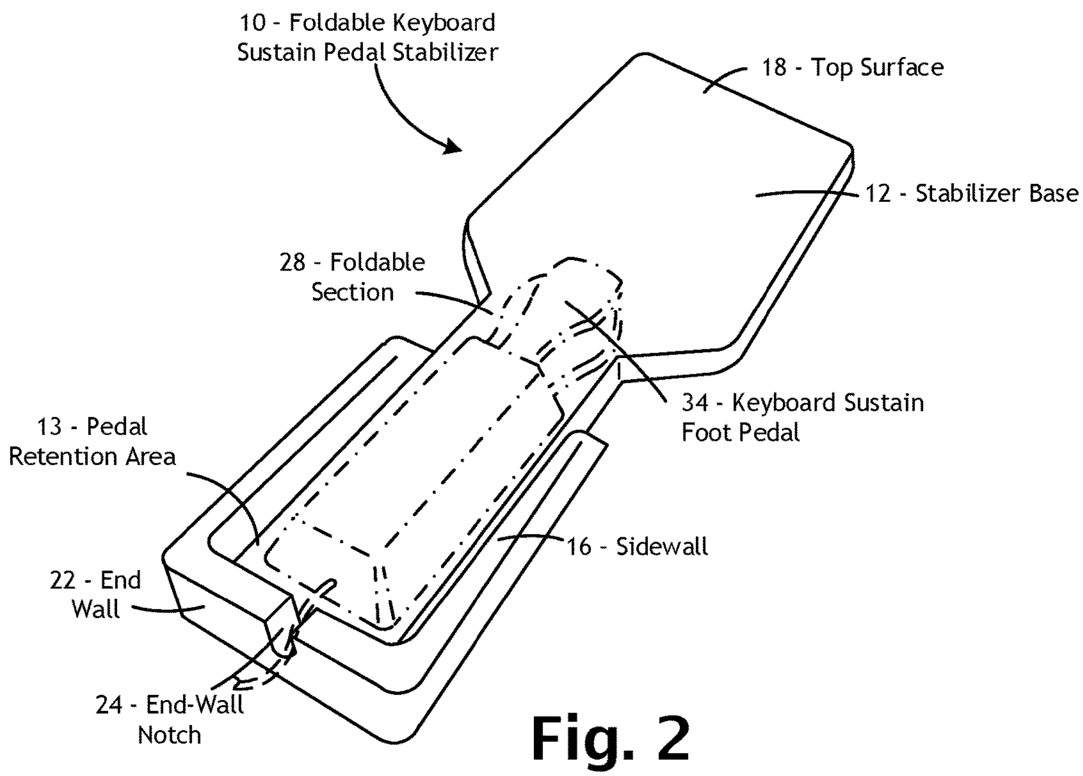
Fig. 2
Fig. 3
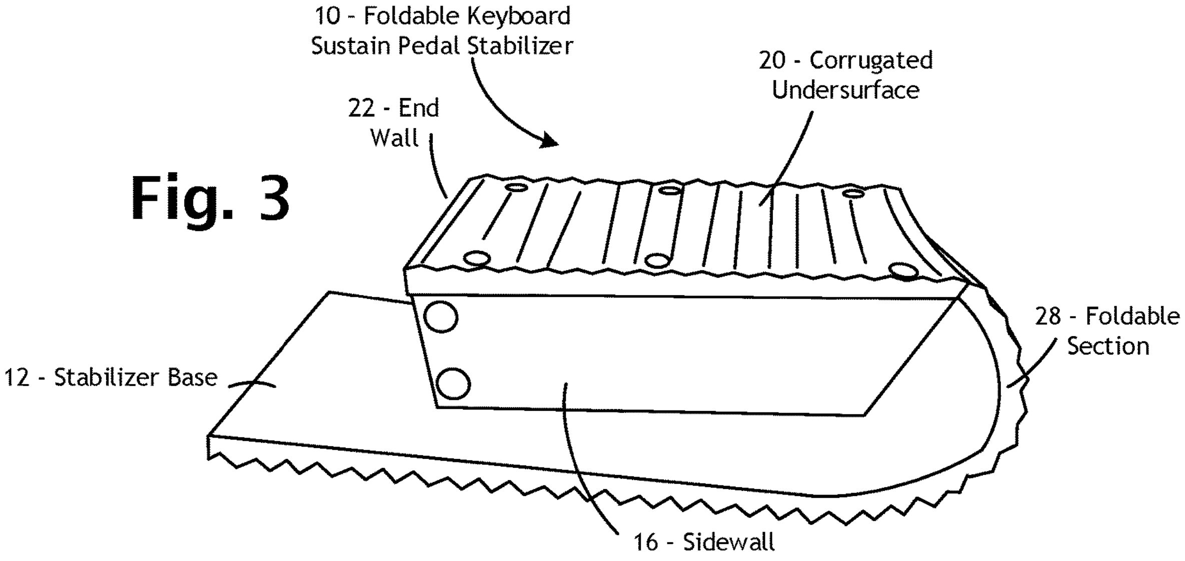

SECTION A–A

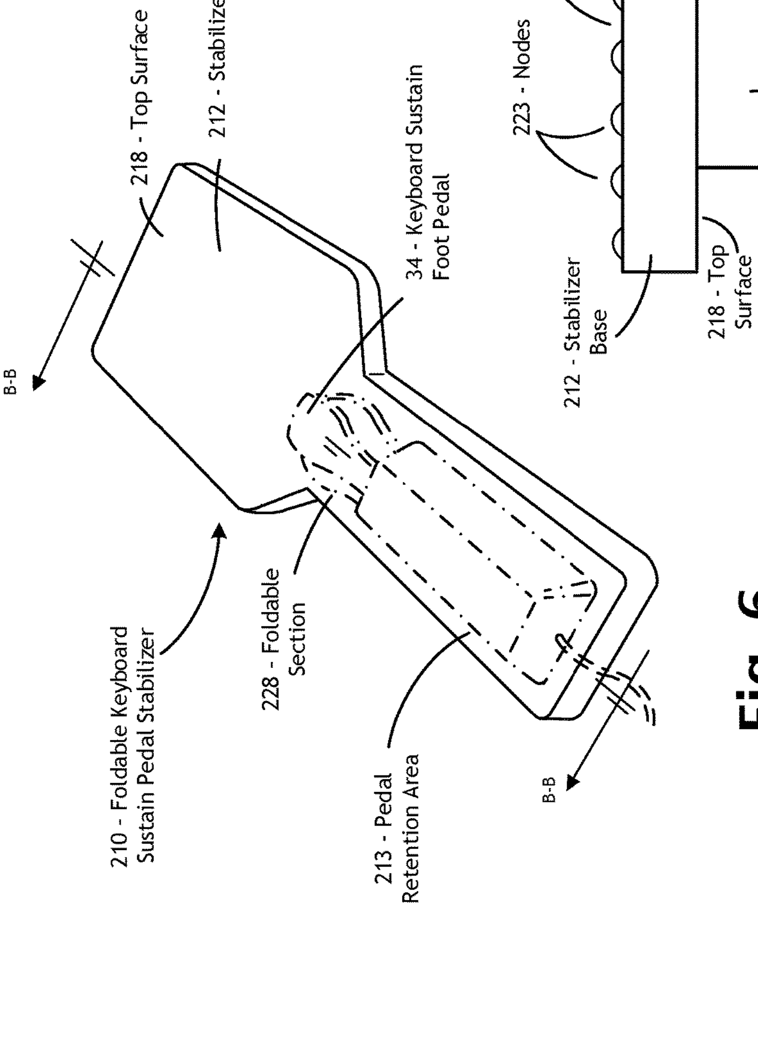
Fig. 6
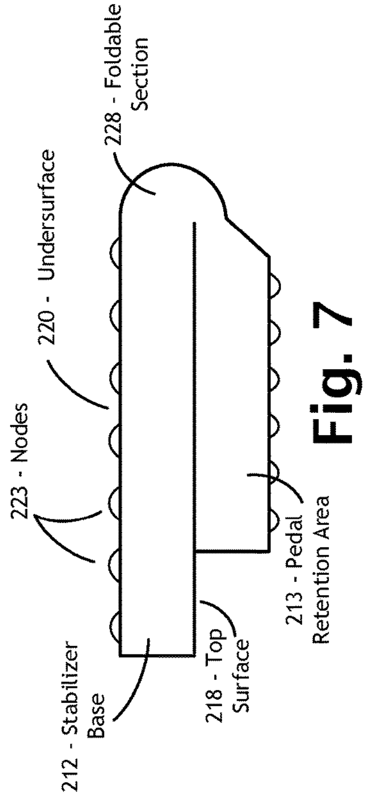
Fig. 7
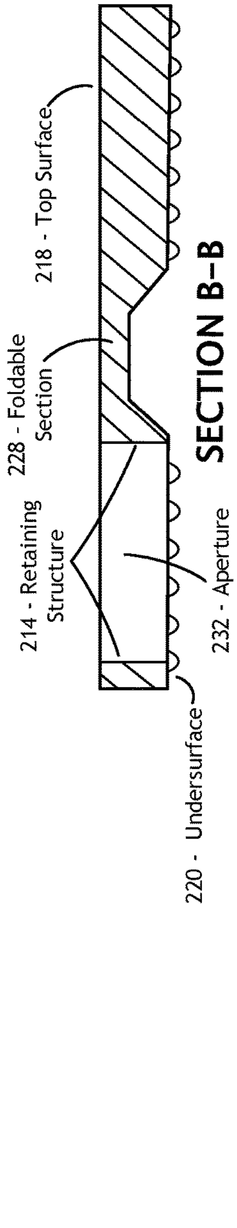
SECTION B–B

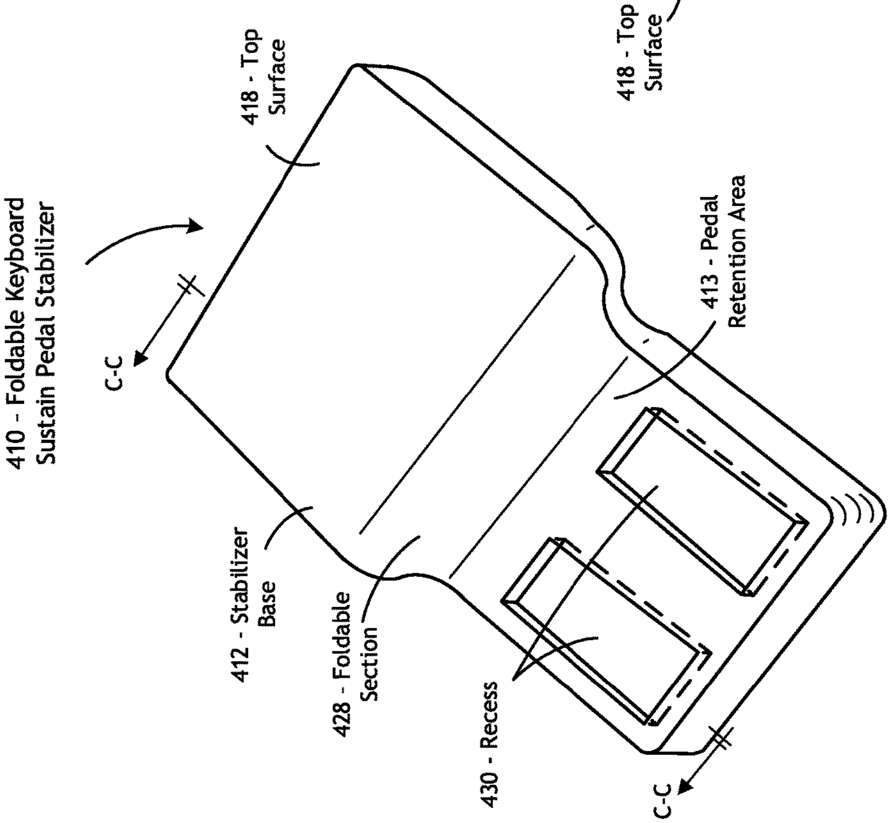
Fig. 11
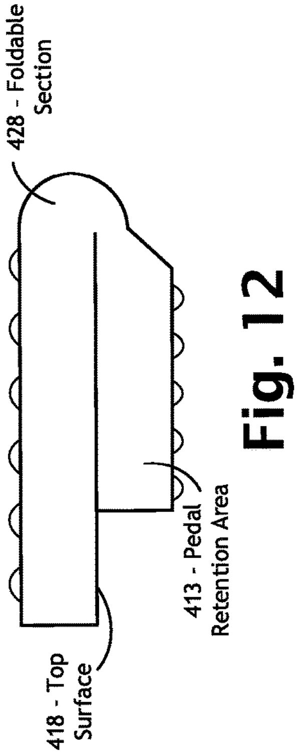
Fig. 12
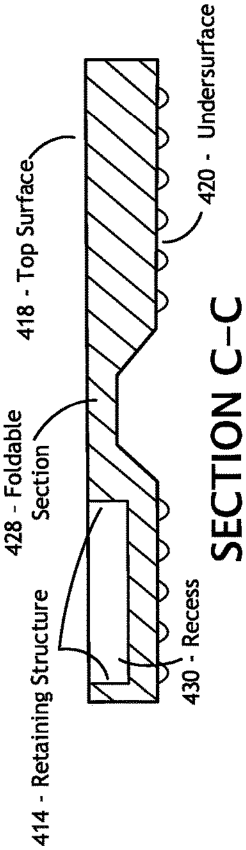
SECTION C–C

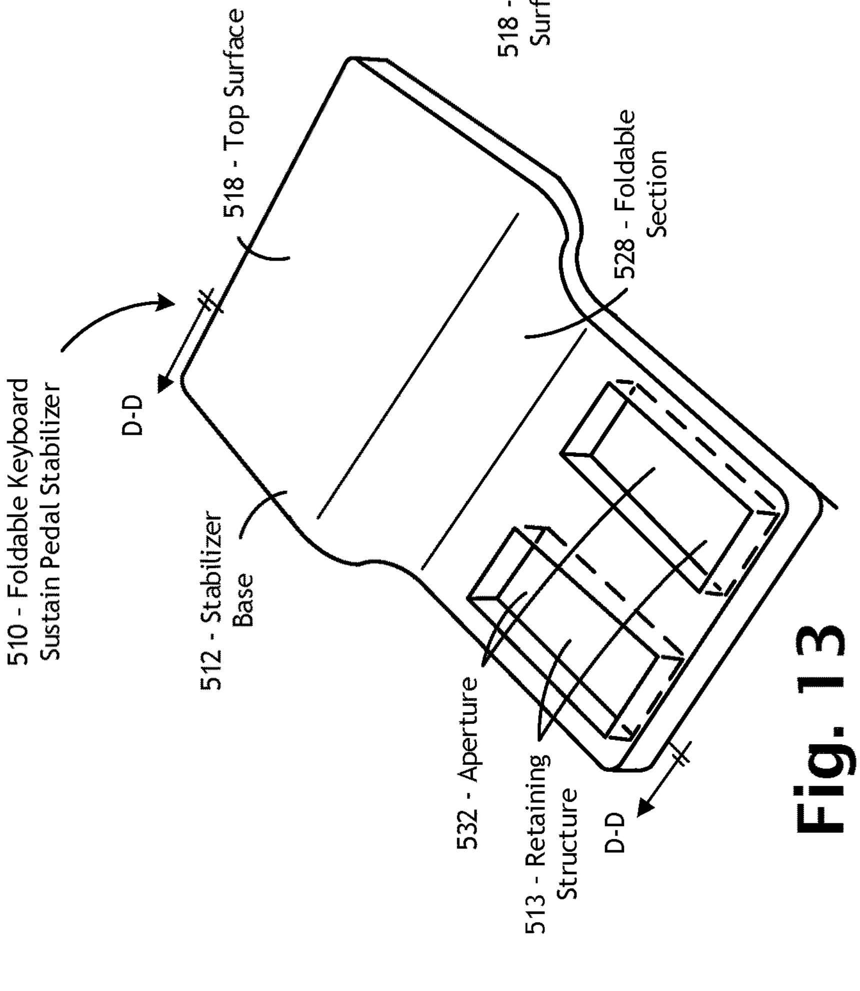
Fig. 13
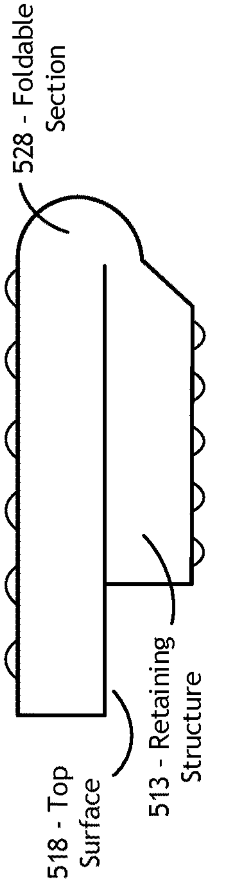
Fig. 14
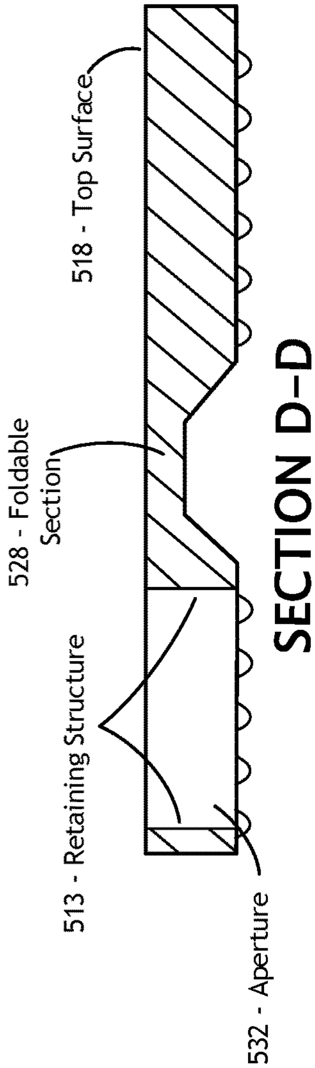
SECTION D–D

FOLDABLE KEYBOARD SUSTAIN PEDAL STABILIZER

CROSS-REFERENCE TO RELATED APPLICATIONS

This Application is a Continuation-In-Part and claims priority to U.S. Ser. No. 17/978,303, entitled "Dual Keyboard Sustain Pedal Stabilizer" (Palmer), filed on Nov. 1, 2022; U.S. Ser. No. 16/998,490, entitled "Keyboard Sustain Pedal Stabilizer" (Palmer), filed on Aug. 20, 2020, now U.S. patent Ser. No. 11/493,947; U.S. Ser. No. 16/270,428, entitled "Keyboard Sustain Pedal Stabilizer" (Palmer), filed on Feb. 7, 2019, now U.S. patent Ser. No. 10/755,680; U.S. Provisional Application No. 62/631,671, entitled "Keyboard Sustain Pedal Stabilizer" (Palmer), filed on Feb. 17, 2018; and to Ser. No. 29/637,287, entitled "Stabilizer for Supporting a Foot-Sustain Pedal" (Palmer), filed on Feb. 15, 2018, now U.S. D 880,578.

FIELD OF USE

The present invention relates to a foldable keyboard sustain foot pedal stabilizer, and particularly to a foldable keyboard sustain pedal stabilizer for use with a keyboard sustain foot pedal for use by musicians.

BACKGROUND OF THE INVENTION

Typically, musicians will try to prevent the keyboard sustain foot pedal from moving and sliding on the floor by placing a heavy object such as a brick behind the keyboard sustain foot pedal.

What is needed is a keyboard sustain pedal stabilizer that does not have any moving parts, has no connection to the keyboard stand, is easy to use, requires no set-up time, is compact and readily transportable, and is compatible with any keyboard sustain foot pedal.

The primary objective of the present invention is to provide a foldable keyboard sustain pedal stabilizer that stabilizes either one or two keyboard sustain foot pedals.

Another objective of the present invention is to provide an attachable pedal cover comprised of a rubber-type pad with an anti-slip means for preventing slipping of either one or two keyboard sustain pedal stabilizers engaging in a stable manner with the floor.

It is still yet another objective of the present invention to provide stable footing for the musician on damp floors for one foot or both feet while providing a foldable keyboard sustain pedal stabilizer that stabilizes either one or two keyboard sustain foot pedals.

SUMMARY OF THE INVENTION

The foldable keyboard sustain pedal stabilizer of the present invention addresses these needs and objectives.

A recess, as used herein, is a compressed section in an object formed by compressing the section in such a manner as to form a crater of a predetermined shape. The compressed section is then surrounded by the perimeter of the retaining structure that is not compressed. The foldable keyboard sustain pedal stabilizer having almost the predetermined shape may be securely and snugly retained within the recess.

Similarly, an aperture, as used herein, is a hollowed-out or open section within the retaining structure as an object forming the hollowed-out section is pressed through the retaining structure in such a manner as to form an aperture of a predetermined shape. The hollowed-out section is then surrounded by sidewalls and end walls of the retaining structure. The foldable keyboard sustain pedal stabilizer having almost the predetermined shape may be securely and snugly retained within the aperture.

As used herein, a "keyboard" instrument includes any instrument equipped with a keyboard, a row of levers which are depressed by the fingers to generate music. The most common of these are the piano, organ, and various electronic keyboards, including synthesizers and digital pianos. Other keyboard instruments, which are struck idiophones operated by a keyboard, which are usually housed in bell towers or belfries of churches or municipal buildings. In its broadest sense, the term keyboard instrument is applied to any instrument equipped with a keyboard and thus may be used to refer to accordions, percussion instruments and many electronic instruments—such as by way of non-limiting example, a celesta, a harpsichord, a virginal, and a carillon, a Moog synthesizer, a spinet keyboard and an Ondes Martenot.

The foldable keyboard sustain pedal stabilizer is designed for use with either one keyboard sustain foot pedal or two keyboard sustain foot pedals.

The foldable keyboard sustain pedal stabilizer comprises a stabilizer base, a pedal-retention area in cooperative engagement with the stabilizer base, a foldable section sandwiched between the stabilizer base and the pedal-retention area, and an underside having a non-slip surface.

The foldable section is made of a flexible material such that the pedal-retention area folds onto the stabilizer base for packaging and transporting in a compact manner. The foldable keyboard sustain pedal stabilizer provides stable footing for the musician on damp floors for one foot or both feet while providing a foldable keyboard sustain pedal stabilizer that stabilizes either one or two keyboard sustain foot pedals. The foldable keyboard sustain pedal stabilizer has no moving parts and is compatible with essentially any keyboard sustain foot pedal.

The underside of the stabilizer base has a non-slip surface.

Preferably, the foldable keyboard sustain pedal stabilizer of the present invention does not connect to the keyboard instrument in any way. The foldable keyboard sustain pedal stabilizer is compatible with any keyboard sustain pedal. The foldable keyboard sustain pedal stabilizer may be made by a 3D printing process. In one preferred embodiment, the foldable keyboard sustain pedal stabilizer is a black rigid polypropylene material, such as an oriented polyethylene terephthalate, or a simulated polypropylene material and preferably having a non-aggressive tread pattern.

For a complete understanding of the foldable keyboard sustain pedal stabilizer of the present invention, reference is made to the accompanying drawings and description in which the presently preferred embodiments of the invention are shown by way of example. None of these drawings are to scale and are being presented to illustrate various preferred embodiments of the invention. The invention may be embodied in many forms without departing from spirit of essential characteristics thereof. It is expressly understood that the drawings are for purposes of illustration and description only and are not intended as a definition of the limits of the invention.

BRIEF DESCRIPTION OF THE DRAWINGS

FIG. 2 depicts an assembly view of the foldable keyboard sustain pedal stabilizer of FIG. 1A, with the keyboard sustain foot pedal being shown in phantom.

FIG. 3 depicts an assembly view of the foldable keyboard sustain pedal stabilizer of FIG. 1A, the pedal retention area now being folded onto and resting upon the stabilizer base.

FIG. 6 depicts an assembly view of a third preferred embodiment of the foldable keyboard sustain pedal stabilizer of the present invention, the keyboard sustain foot pedal being shown in phantom, where the retaining structure is an aperture positioned within the pedal retention area of the retaining structure, along with Section B-B.

FIG. 7 depicts an end view of the foldable keyboard sustain pedal stabilizer of FIG. 6, with the stabilizer base positioned upon the pedal retention area.

FIG. 11 depicts an assembly view of a fifth preferred embodiment of the foldable keyboard sustain pedal stabilizer of the present invention, where the retaining structures are a pair of recesses positioned within the pedal retention area of the retaining structure, for use with a pair of keyboard sustain foot pedals to be positioned side-by-side within the pedal retention area of the retaining structure, along with Section C-C.

FIG. 12 depicts an end view of the foldable keyboard sustain pedal stabilizer of FIG. 11, with the stabilizer base positioned upon the pedal retention area.

FIG. 13 depicts an assembly view of a sixth preferred embodiment of the foldable keyboard sustain pedal stabilizer of the present invention, where the retaining structure are a pair of apertures positioned within the pedal retention area of the retaining structure, for use with a pair of keyboard sustain foot pedals to be positioned side-by-side within the pedal retention area of the retaining structure, along with Section D-D.

FIG. 14 depicts an end view of the foldable keyboard sustain pedal stabilizer of FIG. 13, with the stabilizer base positioned upon the pedal retention area.

DETAILED DESCRIPTION OF THE INVENTION

Figure 1A:
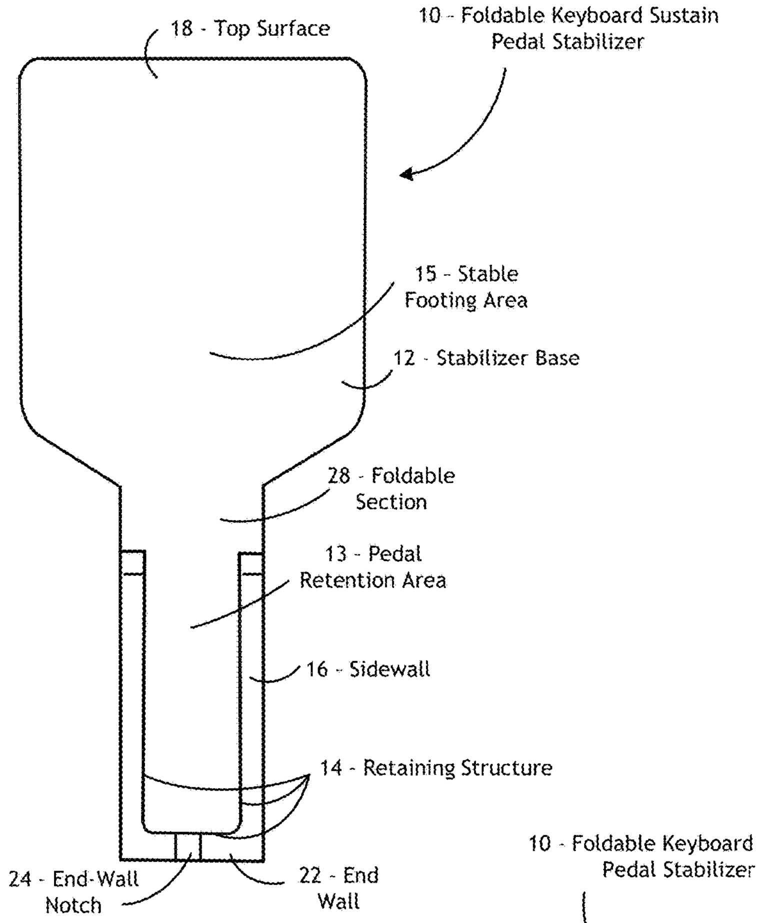
FIG. 1A depicts a top view of a first preferred embodiment of the foldable keyboard sustain pedal stabilizer of the present invention for use with a keyboard sustain foot pedal to be positioned within the pedal retention area of the retaining structure.
Figure 1B:
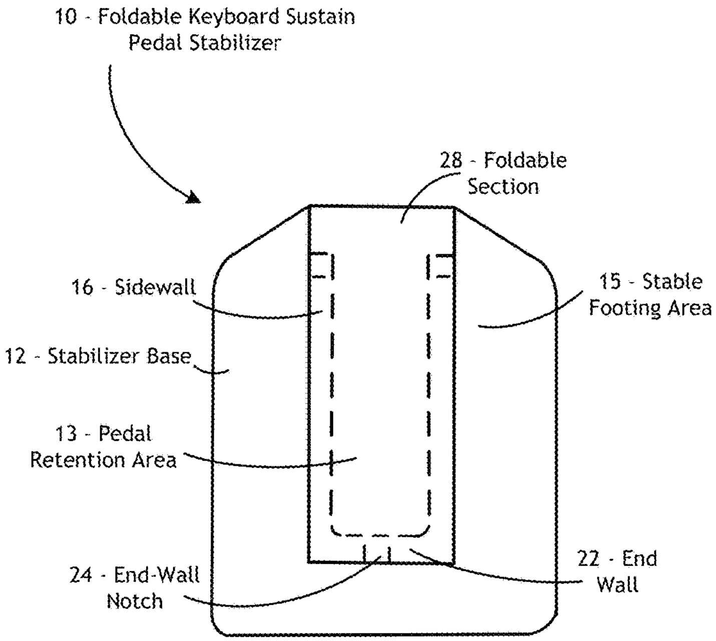
FIG. 1B depicts a top view of the foldable keyboard sustain pedal stabilizer of FIG. 1A, the device now being folded in a compact position ready for transport.

Referring now to the drawings, FIGS. 1A, 1B, 2, and 3 depict a first preferred embodiment of the foldable keyboard sustain pedal stabilizer of the present invention [10]. The foldable keyboard sustain pedal stabilizer [10] is for use with a keyboard sustain foot pedal [34] positioned within the pedal retention area [13] of the structure of the present invention.

FIG. 1A depicts the keyboard sustain pedal stabilizer of the present invention [10] in the unfolded position and FIG. 18 depicts the keyboard sustain pedal stabilizer of the present invention [10] in the folded position, and ready for transport or storage.

The first preferred embodiment of the foldable keyboard sustain pedal stabilizer of the present invention [10] is designed for use with one keyboard sustain foot pedal [34].

The foldable keyboard sustain pedal stabilizer [10] comprises a stabilizer base [12], a pedal-retention area [13] in cooperative engagement with the stabilizer base [12], a foldable section [28] sandwiched between the stabilizer base [12] and the pedal-retention area the stable footing area [13], and an undersurface [20] having a non-slip surface.

The undersurface [20] is depicted as a plurality of parallel treads that are useful in gripping the floor of the venue, approximately evenly spaced from each other.

The retaining structure [14] comprises a pair of sidewalls [16] essentially parallel to each other and an end-wall [22]. Positioned in the end-wall [22] is an end-wall notch for positioning an electrical cable extending from the keyboard sustain foot pedal [34].

The foldable section [28] is made of a flexible material such that the pedal-retention area and the stable footing area [13] folds onto the stabilizer base [12] for packaging and transporting in a compact manner. The foldable keyboard sustain pedal stabilizer of the present invention provides stable footing for the musician on damp floors for one foot while providing a foldable keyboard sustain pedal stabilizer that stabilizes a keyboard sustain foot pedal [34]. The foldable keyboard sustain pedal stabilizer of the present invention [10] has no moving parts and is compatible with essentially any keyboard sustain foot pedal [34] that is commercially available.

FIG. 2 depicts an assembly view of the foldable keyboard sustain pedal stabilizer [10], with the keyboard sustain foot pedal [34] being shown in phantom. FIG. 3 depicts an assembly view of the foldable keyboard sustain pedal stabilizer [10], the pedal retention area [13] now being folded onto and abutting the stabilizer base [12]. The stabilizer base [12] is made of a flexible material that enables a roll up for packaging and transporting the foldable keyboard sustain foot pedal of the present invention [10] in a conventional carrying case or bag.

Figures 4, 5:
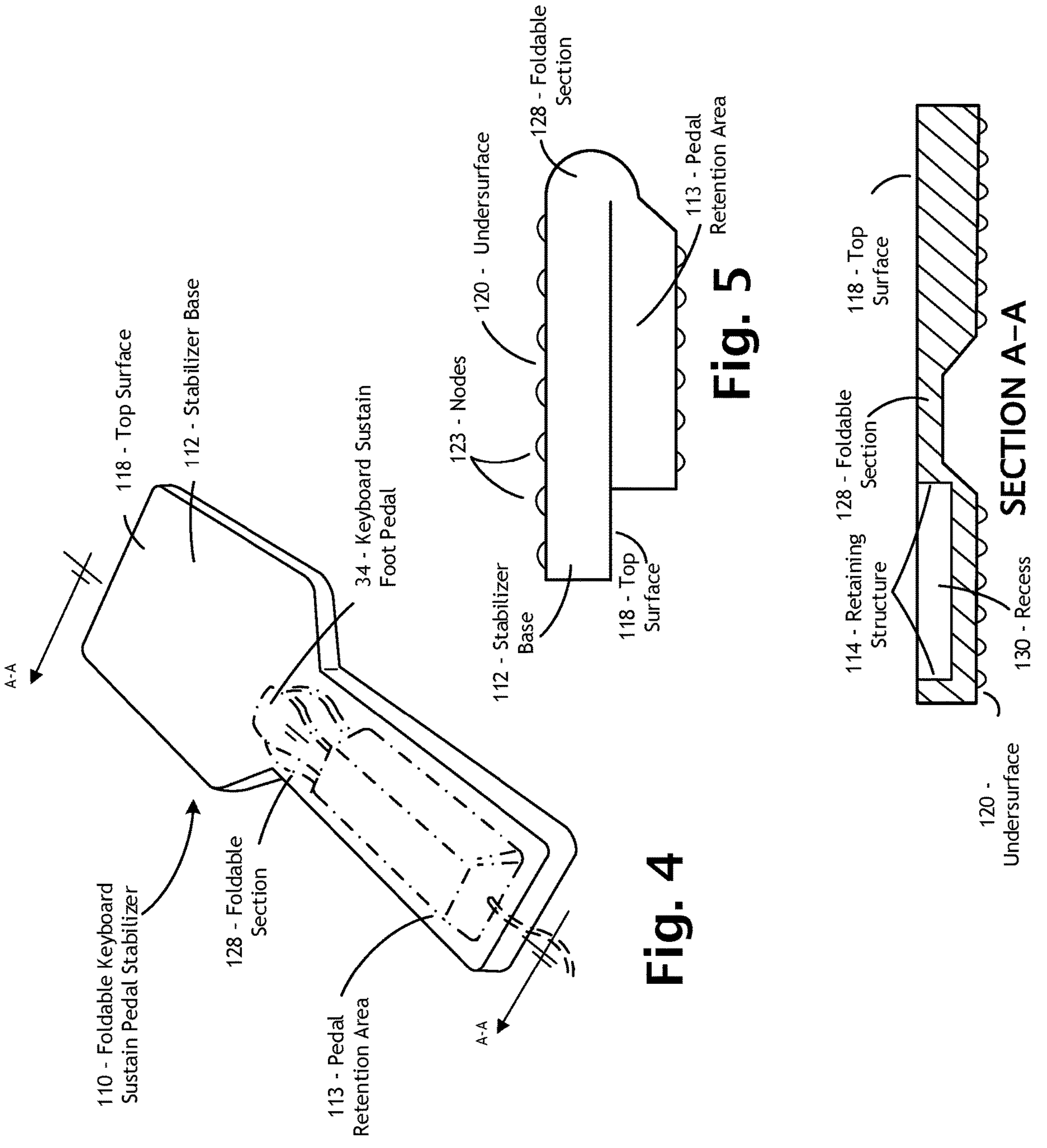
FIG. 4 depicts an assembly view of a second preferred embodiment of the foldable keyboard sustain pedal stabilizer of the present invention, the keyboard sustain foot pedal being shown in phantom, where the retaining structure is positioned a recess within the pedal retention area of the retaining structure, along with Section A-A.
FIG. 5 depicts an end view of the foldable keyboard sustain pedal stabilizer of FIG. 4, with the stabilizer base positioned upon the pedal retention area.

The non-slip undersurface [20] may also be a plurality of aligned nodes [123] as depicted in FIG. 5.

FIGS. 4 and 5 depict a second preferred embodiment of the foldable keyboard sustain pedal stabilizer of the present invention [110]. The keyboard sustain foot pedal [34] is shown in phantom in FIG. 4.

The foldable keyboard sustain pedal stabilizer [110] comprises a stabilizer base [112], a pedal-retention area [113] in cooperative engagement with the stabilizer base [112], a foldable section [128] sandwiched between the stabilizer base [112] and the pedal-retention area [113], and an undersurface [120] having a non-slip surface. The non-slip surface is depicted as a plurality of aligned nodes [123].

The keyboard sustain foot pedal [34] is positioned in the pedal retention area [113] within retaining structure [114].

The retaining structure [114] is positioned a recess [130] within the pedal retention area [113] of the retaining structure. The sidewalls of the recess [130] secure the keyboard sustain foot pedal [34] in place in a snug manner within the foldable keyboard sustain pedal stabilizer of the present invention [110].

Section A-A is taken thru FIG. 4 and depicts the position of the recess [130] relative to the foldable section [128].

FIG. 5 depicts an end view of the foldable keyboard sustain pedal stabilizer [110], with the stabilizer base [112] positioned upon and abutting the pedal retention area [113].

FIGS. 6 and 7 depict a third preferred embodiment of the foldable keyboard sustain pedal stabilizer of the present invention [210]. The keyboard sustain foot pedal [34] is shown in phantom in FIG. 6.

The foldable keyboard sustain pedal stabilizer [210] comprises a stabilizer base [212], a pedal-retention area [213] in cooperative engagement with the stabilizer base [212], a foldable section [228] sandwiched between the stabilizer base [212] and the pedal-retention area [213], and an undersurface [220] having a non-slip surface. The non-slip surface is depicted as a plurality of nodes, approximately equidistant from each other.

The keyboard sustain foot pedal [34] is positioned in the pedal retention area [213] within retaining structure [214].

The retaining structure [214] is positioned an aperture [232] within the pedal retention area [213] of the retaining structure. The sidewalls of the aperture [232] secure the keyboard sustain foot pedal [34] in place in a snug manner within the foldable keyboard sustain pedal stabilizer of the present invention [210].

Section B-B is taken thru FIG. 6 and depicts the position of the aperture [232] relative to the foldable section [228].

FIG. 7 depicts an end view of the foldable keyboard sustain pedal stabilizer [210], with the stabilizer base [212] positioned upon and abutting the pedal retention area [213].

FIGS. 8A, 8B, 9, and 10 depict a fourth preferred embodiment of the foldable keyboard sustain pedal stabilizer of the present invention [310]. The foldable keyboard sustain pedal stabilizer [310] is for use with a pair of keyboard sustain foot pedals [34] to be positioned side-by-side within a pedal retention area [313] of the foldable keyboard sustain pedal stabilizer [310]. A typical keyboard sustain foot pedal [34] is shown in phantom in FIG. 1A.

Figure 8A:
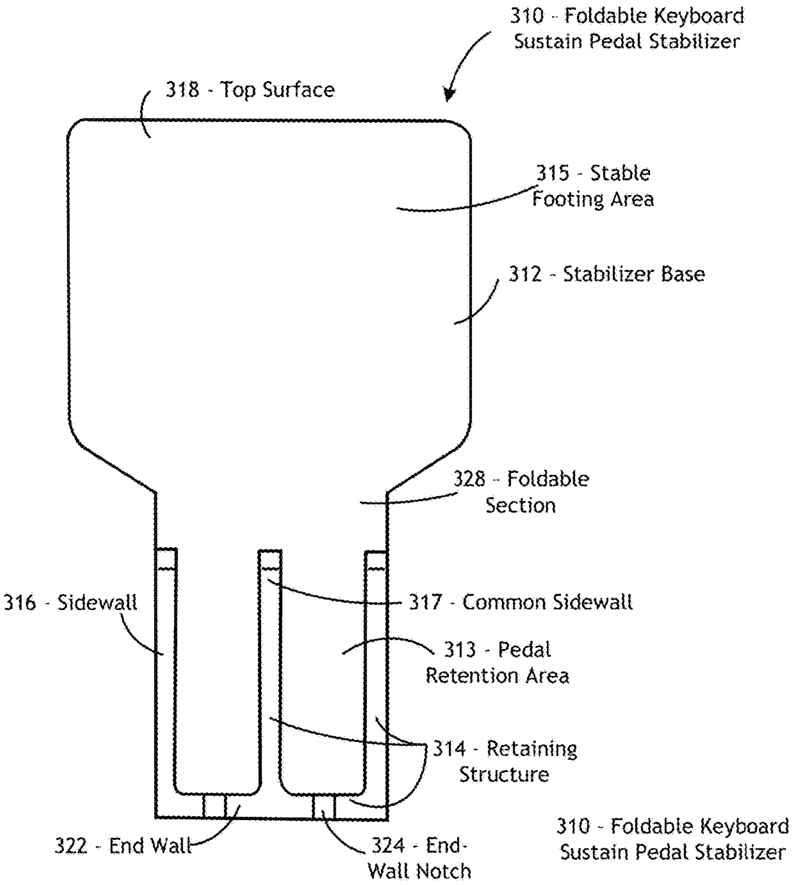
FIG. 8A depicts a top view of a fourth preferred embodiment of the foldable keyboard sustain pedal stabilizer of the present invention for use with a pair of keyboard sustain foot pedals to be positioned side-by-side within the pedal retention area of the retaining structure.
Figure 8B:
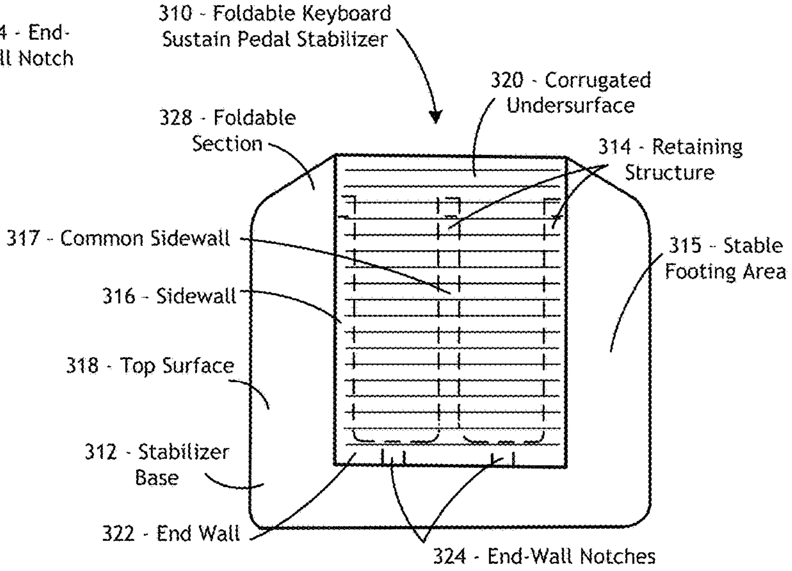
FIG. 8B depicts a top view of the foldable keyboard sustain pedal stabilizer of FIG. 8A, the device now being folded in a compact position ready for transport.

FIG. 8A depicts the keyboard sustain pedal stabilizer of the present invention [310] in the unfolded position and FIG. 8B depicts the keyboard sustain pedal stabilizer of the present invention [310] in the folded position, and ready for transport or storage.

The foldable keyboard sustain pedal stabilizer of the present invention [10] is designed for use with a pair of keyboard sustain foot pedals [34] positioned side-by-side and parallel to each other, separated by a common sidewall [317].

The foldable keyboard sustain pedal stabilizer [310] comprises a stabilizer base [312], a pedal-retention area [313] in cooperative engagement with the stabilizer base [312], a foldable section [328] sandwiched between the stabilizer base [312] and the pedal-retention area [313], and an undersurface [314] having a non-slip undersurface [320].

The undersurface [320] is depicted as a plurality of parallel treads that are useful in gripping the floor of the venue, approximately evenly spaced from each other.

The retaining structure [314] comprises a pair of sidewalls [316] essentially parallel to each other, a common sidewall [317] and an end-wall [322]. The common sidewall [317] is essentially parallel to the pair of sidewalls [316] and equidistant between them. Positioned in the end-wall [322] are a pair of end-wall notch [322] for positioning electrical cables extending from each keyboard sustain foot pedal [34].

The foldable section [328] is made of a flexible material such that the pedal-retention area [313] folds onto the stabilizer base [312] for packaging and transporting in a compact manner. The foldable keyboard sustain pedal stabilizer of the present invention provides stable footing for the musician on damp floors for one foot while providing a foldable keyboard sustain pedal stabilizer that stabilizes a keyboard sustain foot pedal [34]. The foldable keyboard sustain pedal stabilizer of the present invention [310] has no moving parts and is compatible with essentially any keyboard sustain foot pedal [34] that is commercially available.

Figure 9:
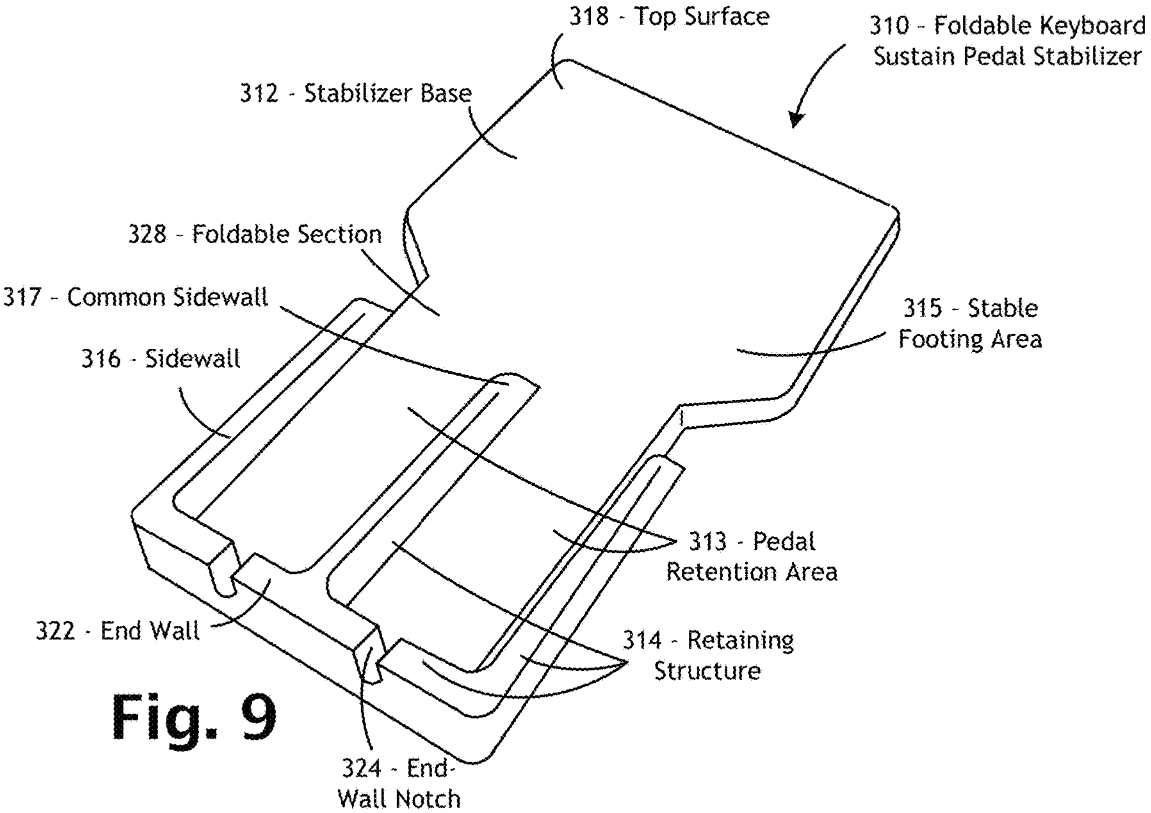
FIG. 9 depicts an assembly view of the foldable keyboard sustain pedal stabilizer of FIG. 8A.
Figure 10:
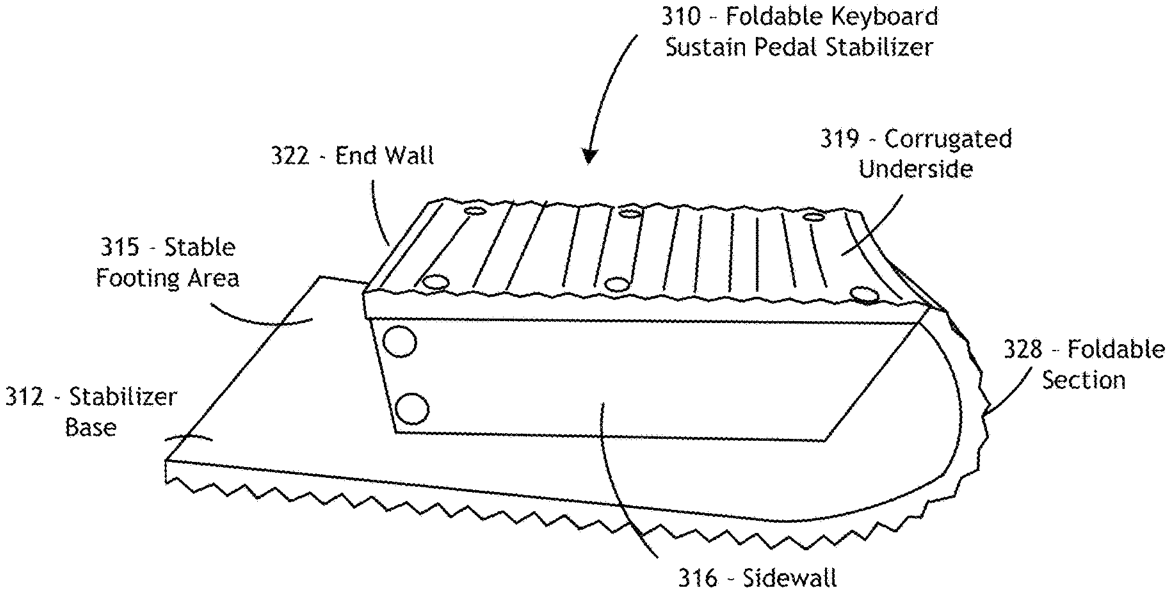
FIG. 10 depicts an assembly view of the foldable keyboard sustain pedal stabilizer of FIG. 8A, the pair of pedal retention areas now being folded and resting upon the stabilizer base.

FIG. 9 depicts an assembly view of the foldable keyboard sustain pedal stabilizer [310], with the keyboard sustain foot pedal [34] being shown in phantom. FIG. 10 depicts an assembly view of the foldable keyboard sustain pedal stabilizer [310], the pedal retention area [313] now being folded onto and abutting the stabilizer base [312].

FIG. 10 depicts an assembly view of the foldable keyboard sustain pedal stabilizer [310], the pair of pedal retention areas [313] now being folded and resting upon the stabilizer base [312].

FIGS. 11 and 12 depict a fifth preferred embodiment of the foldable keyboard sustain pedal stabilizer of the present invention [410]. The foldable keyboard sustain pedal stabilizer [410] is for use with a pair of keyboard sustain foot pedals [34] to be positioned side-by-side within a pedal retention area [413] of the foldable keyboard sustain pedal stabilizer [410]. A typical keyboard sustain foot pedal [34] is shown in phantom in FIG. 1A.

The foldable keyboard sustain pedal stabilizer [410] comprises a stabilizer base [412], a pedal-retention area [413] in cooperative engagement with the stabilizer base [412], a foldable section [428] sandwiched between the stabilizer base [412] and the pedal-retention area [413], and an undersurface [414] having a non-slip surface. The non-slip surface is depicted as a plurality of nodes, approximately equidistant from each other.

Each keyboard sustain foot pedal [34] is positioned in the pedal retention area [413] within retaining structure [414].

Each retaining structure [414] is comprised of a recess [430] within the pedal retention area [413]. The sidewalls of each recess [430] secure each respective keyboard sustain foot pedal [34] in place in a snug manner within the foldable keyboard sustain pedal stabilizer of the present invention [410].

Section C-C is taken thru FIG. 11 and depicts the position of the recess [430] relative to the foldable section [128].

FIG. 12 depicts an end view of the foldable keyboard sustain pedal stabilizer [410], with the stabilizer base [412] positioned upon and abutting the pedal retention area [413].

FIGS. 13 and 14 depict a sixth preferred embodiment of the foldable keyboard sustain pedal stabilizer of the present invention [510]. The foldable keyboard sustain pedal stabilizer [510] is for use with a pair of keyboard sustain foot pedals [34] to be positioned side-by-side within a pedal retention area [513] of the foldable keyboard sustain pedal stabilizer [510]. A typical keyboard sustain foot pedal [34] is shown in phantom in FIG. 1A.

The foldable keyboard sustain pedal stabilizer [510] comprises a stabilizer base [512], a pedal-retention area [513] in cooperative engagement with the stabilizer base [512], a foldable section [528] sandwiched between the stabilizer base [512] and the pedal-retention area [513], and an undersurface [520] having a non-slip surface. The non-slip surface is depicted as a plurality of nodes, each being approximately equidistant from each other.

The keyboard sustain foot pedal [34] is positioned in the pedal retention area [513] within retaining structure [514].

The retaining structure [514] is positioned an aperture [532] within the pedal retention area [513] of the retaining structure. The sidewalls of the aperture [532] secure the keyboard sustain foot pedal [34] in place in a snug manner within the foldable keyboard sustain pedal stabilizer [510].

Section D-D is taken thru FIG. 13 and depicts the position of the aperture [532] relative to the foldable section [528].

FIG. 14 depicts an end view of the foldable keyboard sustain pedal stabilizer [510], with the stabilizer base [512] positioned upon and abutting the pedal retention area [513].

Preferably, the pedal retention area, the foldable section, and the stabilizer base are all made of the same material and preferable are of one-piece construction.

Preferably, the foldable keyboard sustain pedal stabilizer has a one-piece construction.

The foldable keyboard sustain pedal stabilizer [10 and 310] preferably has a uniform thickness of one-quarter inch.

The other preferred embodiments of the foldable keyboard sustain pedal stabilizer [110, 210, 410, and 510] of the present invention have the pedal retention area [113, 213, 410, and 513] with a thickness of one-half inch, the foldable section [128, 218, 418, and 518] with a thickness of one-quarter inch, and the stabilizer base [112, 212, 412, and 512] with a thickness of one-half inch.

As used herein, non-slip means any suitable forms, such as cross-hatching, or a series of closely spaced nubs which extend over the underside of the foldable keyboard sustain pedal stabilizer of the present invention, or other indentations such as swirls which provide an anti-slip surface across the underside of the foldable keyboard sustain pedal stabilizer of the present invention, which form a textured surface that is adapted to provide a secure engagement with the floor.

Throughout this application, various Patents and Applications are referenced by number and inventor. The disclosures of these documents in their entireties are hereby incorporated by reference into this specification in order to more fully describe the state of the art to which this invention pertains.

It is evident that many alternatives, modifications, and variations of the foldable keyboard sustain pedal stabilizer of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST

10. Foldable Keyboard Sustain Pedal Stabilizer—1st Embodiment
12. Stabilizer Base
13. Pedal Retention Area
14. Retaining Structure
15. Stable Footing Area
16. Sidewall
18. Top Surface
20. Corrugated Undersurface
22. End-Wall
24. End-Wall Notch
28. Foldable Section
34. Keyboard Sustain Foot Pedal
110. Foldable Keyboard Sustain Pedal Stabilizer—2nd Embodiment
112. Stabilizer Base
113. Pedal Retention Area
114. Retaining Structure
118. Top Surface
120. Undersurface
123. Node
128. Foldable Section
130. Recess
210. Foldable Keyboard Sustain Pedal Stabilizer—3rd Embodiment
212. Stabilizer Base
213. Pedal Retention Area
214. Retaining Structure
218. Top Surface
220. Undersurface
228. Foldable Section
232. Aperture
310. Foldable Keyboard Sustain Pedal Stabilizer—4th Embodiment
312. Stabilizer Base
313. Pedal Retention Area
314. Retaining Structure
315. Stable Footing Area
316. Sidewall
317. Common Sidewall
318. Top Surface
320. Corrugated Undersurface
322. End-Wall
324. End-Wall Notch
328. Foldable Section
410. Foldable Keyboard Sustain Pedal Stabilizer—5th Embodiment
412. Stabilizer Base
413. Pedal Retention Area
414. Retaining Structure
416. Sidewall
418. Top Surface
420. Undersurface
423. Node
428. Foldable Section
430. Recess
510. Foldable Keyboard Sustain Pedal Stabilizer—6th Embodiment
512. Stabilizer Base
513. Pedal Retention Area
514. Retaining Structure
516. Sidewall
518. Top Surface
520. Undersurface
528. Foldable Section
532. Aperture

The invention claimed is:

1. A foldable keyboard sustain pedal stabilizer for use with a first keyboard sustain foot pedal, said foldable keyboard sustain pedal stabilizer comprises:

a stabilizer base including a stable footing area;

a pedal-retention area in cooperative engagement with said stabilizer base, said pedal-retention area being made of said flexible material, said pedal-retention area including a retaining structure proximate to said stabilizer base, said retaining structure enabling secure retention of said first keyboard sustain foot pedal within said pedal retention area;

a foldable section sandwiched between said stabilizer base and said pedal-retention area, said foldable section being made of a flexible material enabling said pedal-retention area to be folded onto said stabilizer base for packaging and transporting in a compact manner; and an underside of said stabilizer base and said pedal-retention area, said underside having a non-slip surface.

2. The foldable keyboard sustain pedal stabilizer of claim 1, wherein a thickness of said foldable section is less than a thickness of said pedal retention area, and said thickness of said foldable section is less than a thickness of said stabilizer base.

3. The foldable keyboard sustain pedal stabilizer of claim 1, wherein said retaining structure includes a recess positioned in said pedal-retention area, said recess having inner walls, said inner walls ensuring secure retention of said keyboard sustain foot pedal within said pedal retention area.

4. The foldable keyboard sustain pedal stabilizer of claim 1, wherein said retaining structure includes an aperture positioned in said pedal-retention area, said aperture having inner walls, said inner walls ensuring secure retention of said keyboard sustain foot pedal within said pedal retention area.

5. The foldable keyboard sustain pedal stabilizer of claim 1, wherein said pedal-retention area, said foldable section, and said stabilizer base are all made of one-piece construction, and a thickness of said foldable section is less than a thickness of said pedal retention area.

6. The foldable keyboard sustain pedal stabilizer of claim 1, wherein said underside includes a plurality of nodules, and a thickness of said foldable section is less than a thickness of said pedal retention area.

7. The foldable keyboard sustain pedal stabilizer of claim 1, wherein said underside has a plurality of treads, and a thickness of said foldable section is less than a thickness of said pedal retention area.

8. A foldable keyboard sustain pedal stabilizer for use with a first keyboard sustain foot pedal and a second keyboard sustain foot pedal, said foldable keyboard sustain pedal stabilizer comprising:

a stabilizer base including a stable footing area;

a pedal-retention area including a retaining structure, said retaining structure enabling secure retention of said first keyboard sustain foot pedal and said second keyboard sustain foot pedal within said pedal-retention area;

a foldable section sandwiched between said stabilizer base and said pedal-retention area, said foldable section being made of a flexible material enabling said pedal-retention area to be folded onto said stabilizer base for packaging and transporting in a compact manner; and an underside of said stabilizer base having a non-slip surface.

9. The foldable keyboard sustain pedal stabilizer of claim 8, wherein said first keyboard sustain foot pedal and said second keyboard sustain foot pedal are positioned side-by-side, and a thickness of said foldable section is less than a thickness of said pedal retention area.

10. The foldable keyboard sustain pedal stabilizer of claim 9, wherein a thickness of said foldable section being less than a thickness of said pedal retention area, and said thickness of said foldable section being less than a thickness of said stabilizer base.

11. The foldable keyboard sustain pedal stabilizer of claim 8, wherein said first keyboard sustain foot pedal is parallel to said second keyboard sustain foot pedal, and a thickness of said foldable section is less than a thickness of said pedal retention area.

12. The foldable keyboard sustain pedal stabilizer of claim 8, wherein said pedal-retention area, said foldable section, and said stabilizer base are all made of one-piece construction, and a thickness of said foldable section is less than a thickness of said pedal retention area.

13. A foldable keyboard sustain pedal stabilizer for use with a first keyboard sustain foot pedal and a second keyboard sustain foot pedal, said foldable keyboard sustain pedal stabilizer comprising:

a stabilizer base including a stable footing area;

a first pedal-retention area including a first retaining structure, said first retaining structure enabling secure retention of said first keyboard sustain foot pedal within said first pedal-retention area;

a second pedal-retention area including a second retaining structure, said second retaining structure enabling secure retention of said second keyboard sustain foot pedal within said second pedal-retention area;

a foldable section sandwiched between said stabilizer base and said first pedal-retention area, said foldable section being made of a flexible material enabling said first pedal-retention area to fold onto said stabilizer base for packaging and transporting in a compact manner; and an underside of said stabilizer base having a non-slip surface.

14. The foldable keyboard sustain pedal stabilizer of claim 13, wherein a thickness of said foldable section being less than a thickness of said pedal retention area, and said thickness of said foldable section being less than a thickness of said stabilizer base.

15. The foldable keyboard sustain pedal stabilizer of claim 13, wherein said underside includes a plurality of nodules, and a thickness of said foldable section is less than a thickness of said pedal retention area.

16. The foldable keyboard sustain pedal stabilizer of claim 13, wherein said underside has a plurality of treads, and a thickness of said foldable section is less than a thickness of said pedal retention area.

17. A foldable keyboard sustain pedal stabilizer for use with a keyboard sustain foot pedal, said foldable keyboard sustain pedal stabilizer comprises:

a stabilizer base including a stable footing area;

a pedal-retention area in cooperative engagement with said stabilizer base, said keyboard sustain foot pedal fitting snugly within a recess or an aperture in a retaining structure in said pedal-retention area, said recess or said aperture having inner walls, said retaining structure ensuring secure retention of said keyboard sustain foot pedal within said pedal retention area;

a foldable section sandwiched between said stabilizer base and said pedal-retention area, said foldable section being made of a flexible material enabling said pedal-retention area to be folded onto said stabilizer base for packaging and transporting in a compact manner; and an underside of said stabilizer base and said pedal-retention area, said underside having a non-slip surface.

18. The foldable keyboard sustain pedal stabilizer of claim 17, wherein a thickness of said foldable section being less than a thickness of said pedal retention area, and said thickness of said foldable section being less than a thickness of said stabilizer base.

19. The foldable keyboard sustain pedal stabilizer of claim 17, wherein said inner walls of said recess ensure secure retention of said keyboard sustain foot pedal within said pedal retention area; and said pedal-retention area, said foldable section, and said stabilizer base are made of one-piece construction.

20. The foldable keyboard sustain pedal stabilizer of claim 17, wherein said inner walls of said aperture ensure secure retention of said keyboard sustain foot pedal within said pedal retention area; and said pedal-retention area, said foldable section, and said stabilizer base are made of one-piece construction.

21. The foldable keyboard sustain pedal stabilizer of claim 17, wherein said underside includes a plurality of nodules, and a thickness of said foldable section is less than a thickness of said pedal retention area.

22. The foldable keyboard sustain pedal stabilizer of claim 17, wherein said underside has a plurality of treads, and a thickness of said foldable section is less than a thickness of said pedal retention area.

23. The foldable keyboard sustain pedal stabilizer of claim 17, wherein said recess has inner walls, said inner walls retaining therewithin in a snugly fit manner said keyboard sustain foot pedal, and a thickness of said foldable section is less than a thickness of said pedal retention area.

24. The foldable keyboard sustain pedal stabilizer of claim 17, wherein said aperture has inner walls, said inner walls retaining therewithin in a snugly fit manner said keyboard sustain foot pedal, and a thickness of said foldable section is less than a thickness of said pedal retention area.

* * * * *